(12) United States Patent
Yang

(10) Patent No.: US 9,351,366 B1
(45) Date of Patent: May 24, 2016

(54) ISOLATION DIMMER CIRCUIT STRUCTURE

(71) Applicant: Sen-Tai Yang, New Taipei (TW)

(72) Inventor: Sen-Tai Yang, New Taipei (TW)

(73) Assignee: YUJING TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/555,649

(22) Filed: Nov. 27, 2014

(51) Int. Cl.
*H05B 37/02* (2006.01)
*H05B 33/08* (2006.01)

(52) U.S. Cl.
CPC ........ *H05B 33/0845* (2013.01); *H05B 33/0887* (2013.01)

(58) Field of Classification Search
CPC ............................. H05B 33/0845; H05B 39/04
USPC .................................................. 315/127, 158
See application file for complete search history.

(56) References Cited

U.S. PATENT DOCUMENTS

| 2010/0201273 A1* | 8/2010 | Thirugnanasambandham | H03K 17/0822 315/127 |
| --- | --- | --- | --- |
| 2012/0230073 A1* | 9/2012 | Newman, Jr. | H05B 33/0815 363/126 |
| 2013/0188105 A1* | 7/2013 | Dobrenko | E06B 9/24 349/16 |
| 2014/0126261 A1* | 5/2014 | Newman, Jr. | H02M 1/081 363/128 |

* cited by examiner

*Primary Examiner* — Don Le
(74) *Attorney, Agent, or Firm* — Pro-TECHTOR International Services; Ian Oglesby

(57) ABSTRACT

An isolation dimmer circuit structure includes a control circuit module having an input end for receiving a sensing signal and an output end for outputting a control signal. An optocoupler is provided between the control circuit module and a light source power supply circuit. The light source power supply circuit is further connected to a light source. A protection circuit includes first and second resistors and first and second diodes. The first resistor is connected in series between the positive terminal of a DC power supply and the anode of the first diode, forming a node A, the cathode of the first diode is connected to a first terminal of a control input end connected to a traditional dimmer circuit to form an overvoltage protection mechanism. The second resistor is provided between the node A and the input end of the control circuit module, and the second diode is provided between the positive terminal of the DC power supply and a second terminal of the control input end to form a reverse voltage protection mechanism.

7 Claims, 6 Drawing Sheets

ISOLATION DIMMER CIRCUIT STRUCTURE

BACKGROUND OF THE INVENTION

1. Field of the Invention

The invention relates to an isolation dimmer circuit structure, and more particularly, to an isolation dimmer circuit structure that can be connected to various types of traditional dimmer circuits to control LED light sources and further provides protection against reversed voltage polarities and overvoltage.

2. Description of the Prior Art

Among dimmer circuits used for traditional light source elements (such as incandescent lamps), one simple control method is to directly connect a variable resistor in series between a power supply and the light source element. The resistance of the variable resistor is changed as needed to control the current flowing through the light source element, thus controlling the brightness of the light source element.

Another approach involves converting an external AC power supply into a DC voltage (or PWM) control signal. By applying variable DC voltages (or the PWM signal) to a constant load (the traditional light source element), the brightness of the light source element can then be controlled.

Since traditional light source elements and LED elements are significantly different in terms of light-emitting principles and electrical characteristics, a traditional dimmer circuit cannot be applied directly on lightings using LEDs as the light source. If a traditional dimmer circuit is to be used for adjusting the brightness of a LED, then a converting circuit has to be specially designed according to the original control method (resistive, voltage or PWM type) used by the traditional dimmer circuit. The converting circuit is then coupled between the traditional dimmer circuit and the LED element to convert a control signal (changes in resistance, voltage or PWM) output by the traditional dimmer circuit into a control signal suitable for controlling the brightness of the LED element.

However, the above converting circuit typically has the following shortcomings:

1. Since the converting circuits are specially designed according to the control methods (resistive, voltage or PWM type) of the traditional dimmer circuits, so converting circuits for different types of dimmer circuits have to be developed separately and cannot be used interchangeably. This lengthens the development time course and increases the cost, so it is not economical.

2. During the assembly process of the converting circuit and the traditional dimmer circuit, if there is an operational error (e.g. voltage polarities are reversed) or usage error (e.g. voltage is too high), circuit components may be damaged. In order to prevent such damages, a complicated protection mechanism (circuit) is required in the converting circuit. This kind of protection mechanism (circuit) will inevitably increase the overall cost.

In view of the shortcomings in the conventional converting circuits when in actual use, the present invention is proposed to effectively reduce the production cost and increase foolproof protection.

SUMMARY OF THE INVENTION

One main objective of the present invention is to provide an isolation dimmer circuit structure for receiving and converting control signals output by various different traditional dimmer circuits in order to control energy-efficient LED light sources, so that various dimmer circuits used for traditional light sources can also be used to control LED light sources, thereby reducing product development and production costs and increasing the overall economic benefits.

Another objective of the present invention is to provide an isolation dimmer circuit structure that protects the circuit components from reversed voltage polarities and overvoltage to prevent damage caused by production or operational errors.

In order to achieve the above objectives and efficacies, the technical means employed by the present invention may include: a control circuit module provided between a positive terminal and a negative terminal of a DC power supply, the control circuit module including an input end for receiving a sensing signal and an output end for outputting a control signal; an optocoupler including an input end connected to the output end of the control circuit module, the optocoupler further including two output ends connected to input ends of a light source power supply circuit, output ends of the light source power supply circuit being connected to a light source, wherein the optocoupler receives and converts the control signal from the control circuit module and outputs an operating signal, which is received by the light source power supply circuit in order to generate different outputs that allow changes in the brightness of the light source; a protection circuit including a first resistor, a second resistor, a first diode, a second diode and a third diode, wherein one end of the first resistor is connected to the positive terminal of the DC power supply, while the other end of the first resistor is connected to the anode of the first diode at a node A, the cathode of the first diode is connected to a first terminal of a control input end, the second resistor is provided between the node A and the input end of the control circuit module, the cathode of second diode is connected to the positive terminal of the DC power supply, while the anode of the second diode is connected to a second terminal of the control input end, the cathode of third diode is connected to the input end of the control circuit module, while the anode of the third diode is connected to the second terminal of the control input end.

In the above structure, the input end of the control circuit module is further connected to the negative terminal of the DC power supply via a capacitor, such that the capacitor forms a RC circuit with the second resistor.

In the above structure, a protection circuit further includes an overload protection element provided between the second terminal of the control input end and the negative terminal of the DC power supply In the above structure, the overload protection element is a fuse.

In the above structure, the overload protection element is a thermistor with a positive temperature coefficient.

In the above structure, the light source is a light emitting diode.

In the above structure, the control circuit module is a circuit structure with a built-in current source.

The accomplishment of this and other objectives of the invention will become apparent from the following description and its accompanying drawings of which:

DETAILED DESCRIPTION OF THE PREFERRED EMBODIMENT

Figure 1:
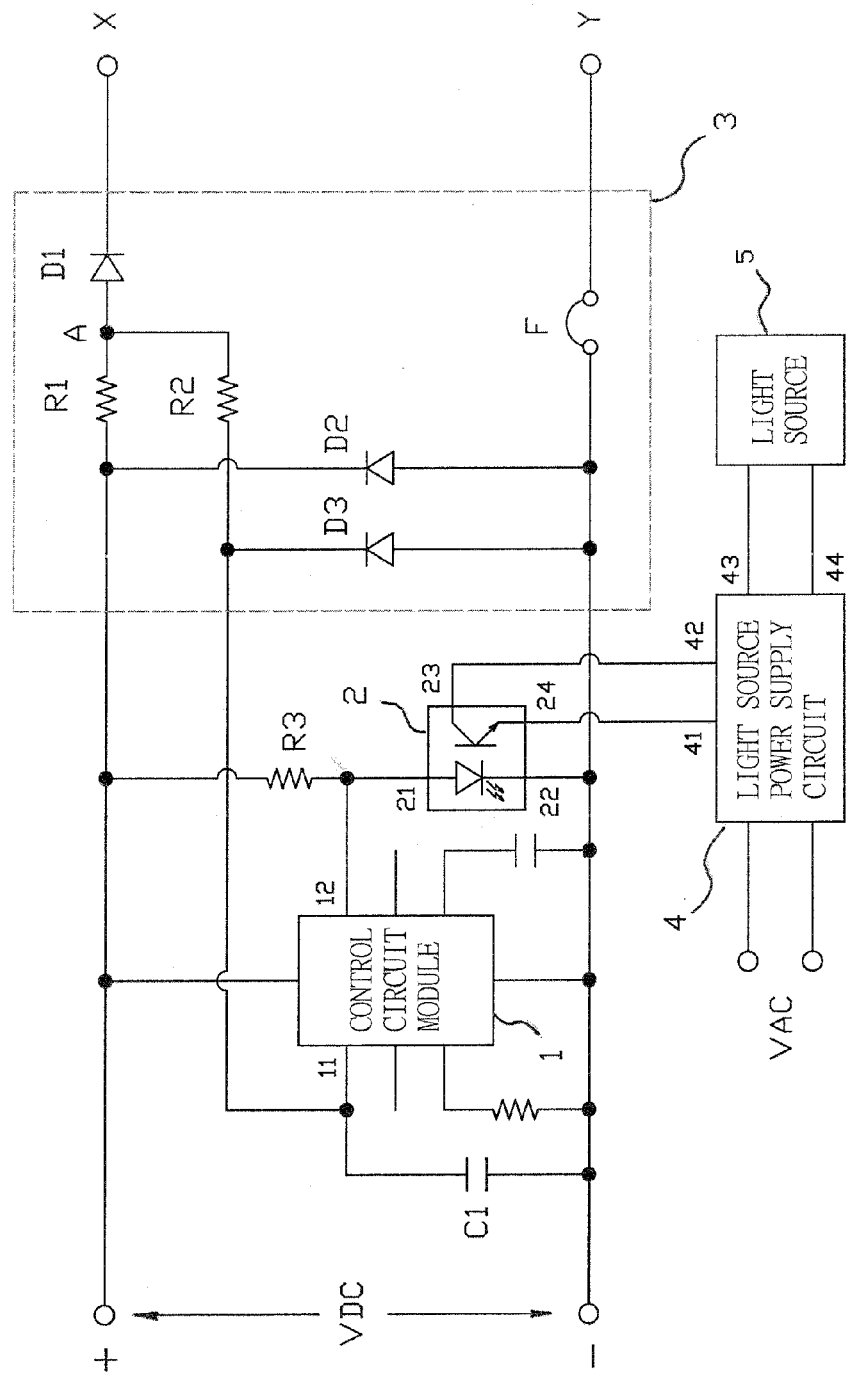
FIG. 1 is a basic circuit structure diagram of a first embodiment of the present invention.

Referring to FIG. 1, a circuit structure in accordance with a first embodiment of the present invention essentially includes: a control circuit module 1, an optocoupler 2 and a protection circuit 3. The control circuit module 1 is provided between the positive and the negative terminals of a DC power supply VDC. The control circuit module 1 has an input end 11 for receiving a sensing signal and an output end 12 for outputting a control signal.

The optocoupler 2 includes an input end 21 connected to the output end 12 of the control circuit module 1, and another input end 22 connected to the negative terminal of the DC power supply VDC. The optocoupler 2 includes two output ends 23 and 24 connected to input ends 41 and 42 of a light source power supply circuit 4, respectively.

In one implementation, the light source power supply circuit 4 includes output ends 43 and 44 connected to a light source 5 (which can be a LED). The light source power supply circuit 4 is able to convert an external AC power supply VAC into a DC power required for illumination of the light source 5 under the control of the optocoupler 2.

The protection circuit 3 includes a first resistor R1, a second resistor R2, a first diode D1, a second diode D2 and a third diode D3. The first resistor R1 is connected to the positive terminal of the DC power supply VDC at one end, while the other end of the first resistor R1 is connected to the anode of the first diode D1 at a node A. The cathode of the first diode D1 is connected to a first terminal X of a control input end. The second resistor R2 is provided between the node A and the input end 11 of the control circuit module 1. The cathode of second diode D2 is connected to the positive terminal of the DC power supply VDC, while the anode of the second diode D2 is connected to a second terminal Y of the control input end. The cathode of third diode D3 is connected to the input end 11 of the control circuit module 1, while the anode of the third diode D3 is connected to the second terminal Y of the control input end.

In one implementation, a current-limiting third resistor R3 is provided between the input end 21 of the optocoupler 2 and the positive terminal of the DC power supply VDC. The input end 11 of the control circuit module 1 is further connected to the negative terminal of the DC power supply VDC via a capacitor C1. As such, the capacitor C1 forms a RC circuit with the second resistor R2.

In practice, the first and the second terminals X and Y of the control input end are connected to two output terminals of an external traditional dimmer mechanism or circuit. The operations of the above circuit in accordance with the present invention will now be explained with respect to traditional dimmer mechanisms or circuits with different drive modes.

Figure 2:
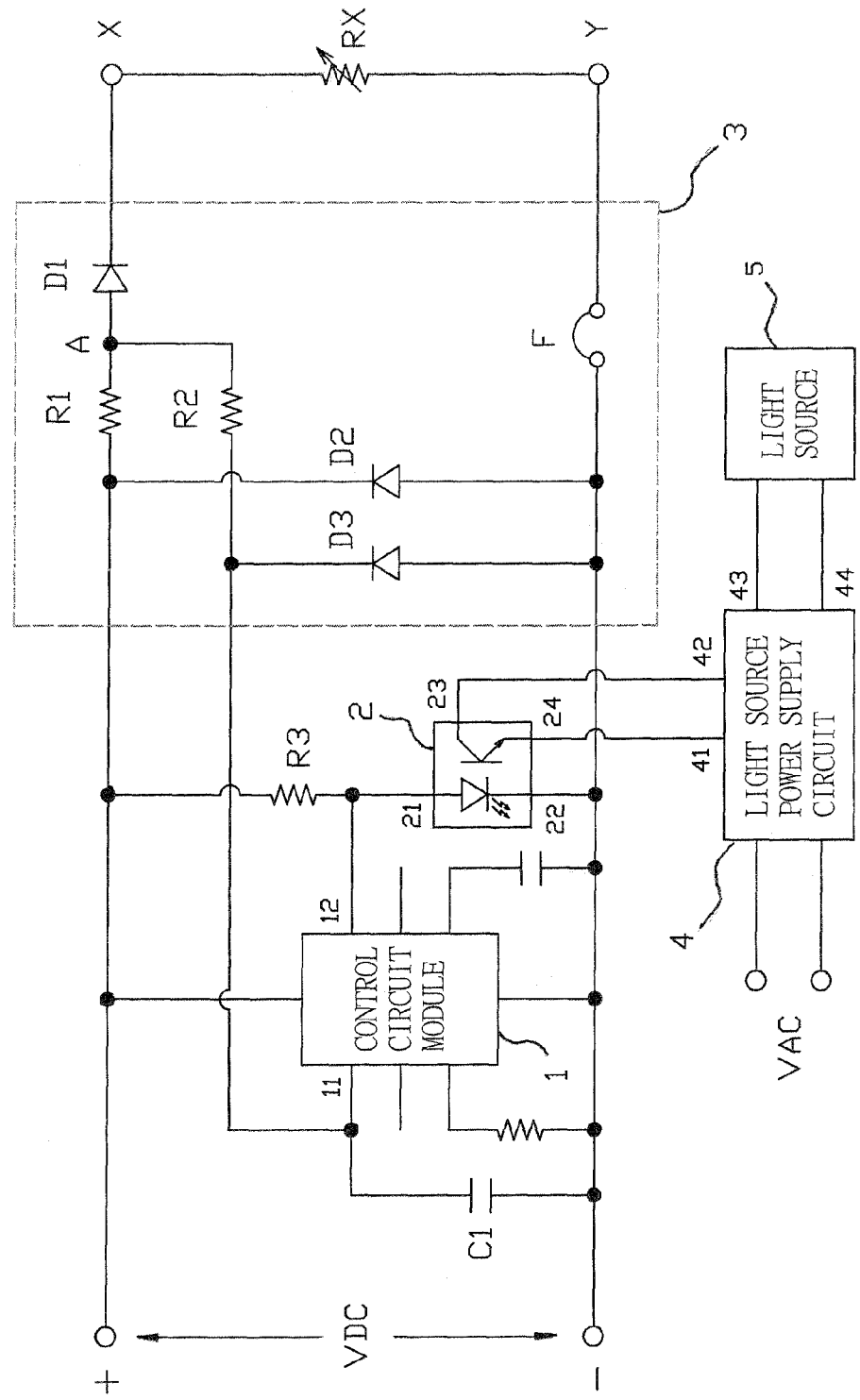
FIG. 2 is a circuit diagram of the first embodiment of the present invention connected with a traditional variable-resistive dimmer mechanism.

Referring now to FIG. 2, the circuit structure in accordance with the first embodiment of the present invention is connected with a traditional dimmer mechanism having a variable resistive characteristic. This can be regarded as adding a (variable) resistor RX load between the first and the second terminals X and Y of the control input end.

Thus, after subtracting the voltage drop of about 0.1~0.2 V (which can be omitted) across the first diode D1, the voltage VA at the node A is equal to VDC*[RX/(RA+RX)]. The voltage VA charges the capacitor C1 via the second resistor R2, thus creating a sensing signal to be input into the control circuit module 1 through the input end 11. The control circuit module 1 outputs a corresponding control signal from the output end 12. The control signal is then input to the optocoupler 2 via the input end 21. The optocoupler 2 outputs an operating signal from the output ends 23 and 24, which is then fed into the light source power supply circuit 4 through the input ends 41 and 42. The light source power supply circuit 4 then drives the light source 5 to emit light through the output ends 43 and 44.

Since a different resistor load RX creates a different sensing signal that is input to the control circuit module 1, this allows the light source 5 to emit lights of different brightness through the optocoupler 2 and the light source power supply circuit 4. As a result, by employing the circuit structure of the present invention, the external traditional dimmer mechanism (the variable resistor) is capable of controlling the brightness of the light source 5 (a LED load).

Figure 3:
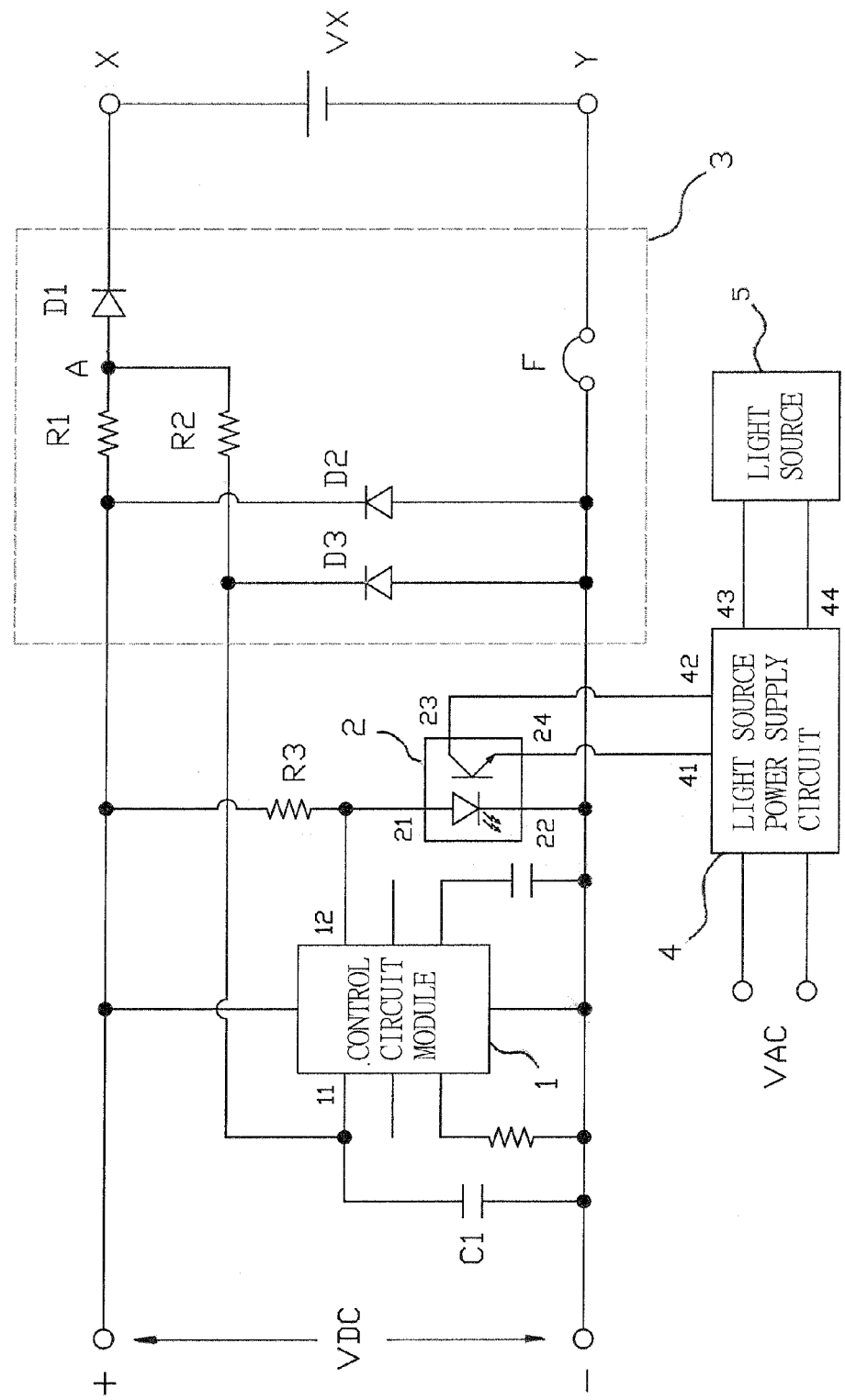
FIG. 3 is a circuit diagram of the first embodiment of the present invention connected with a traditional voltage drive dimmer circuit.

Referring now to FIG. 3, the circuit structure in accordance with the first embodiment of the present invention is connected to a traditional dimmer circuit having a DC voltage drive characteristic. This can be regarded as adding a DC drive voltage VX between the first and the second terminals X and Y of the control input end. In the embodiment disclosed in this drawing, the voltage VX is connected in a forward-biased manner between the first and the second terminals X and Y of the control input end, that is, the positive terminal of the DC drive voltage VX is connected to the first terminal X, and the negative terminal of the DC drive voltage VX is connected to the second terminal Y.

a. When DC drive voltage VX<DC power supply VDC, the voltage at the node A (VA') is equal to VX+(0.1~0.2)V, and the voltage VA' at the node A charges the capacitor C1 through the second resistor R2, creating a sensing signal to be fed into the control circuit module 1 via the input end 11. The subsequent operations of making the light source 5 illuminate by driving the light source power supply circuit 4 through the optocoupler 2 are the same as the drive operations described with respect to FIG. 2.

b. When DC drive voltage VX>DC power supply VDC, the cathode voltage of the first diode D1 is VX, and the anode of the first diode D1 is VDC, since DC power supply VDC<DC drive voltage VX, the first diode D1 is not conducting. As a result, components such as the control circuit module 1, the optocoupler 2 and the light source power supply circuit 4 are protected from overvoltage.

Figure 4:
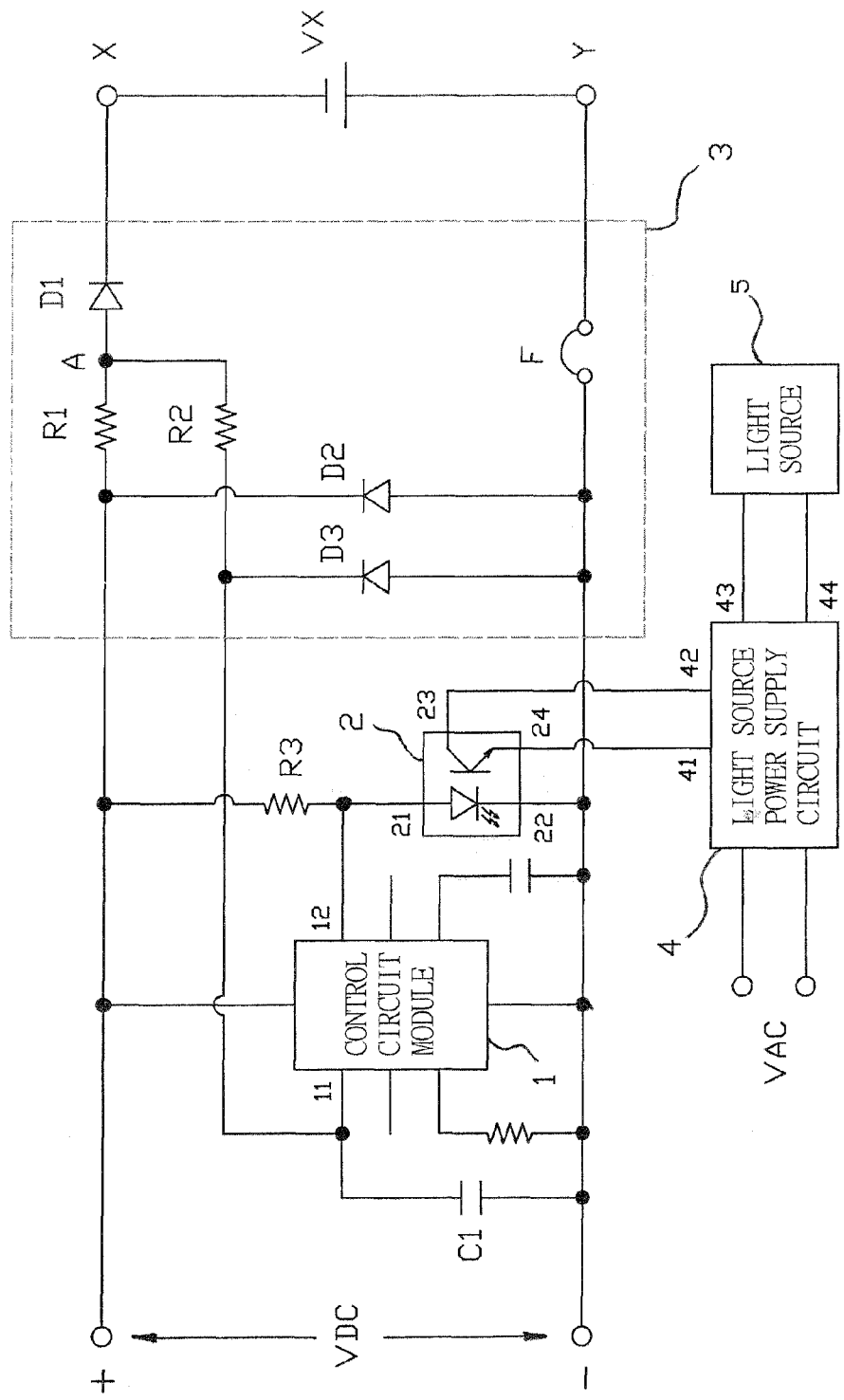
FIG. 4 is a circuit diagram of FIG. 3 when voltage polarities are reversed.

Referring now to FIG. 4, the circuit structure in accordance with the first embodiment of the present invention is connected to a traditional dimmer circuit having a DC voltage drive characteristic. This can be regarded as adding a DC drive voltage VX between the first and the second terminals X and Y of the control input end. However, in the embodiment illustrated in this drawing, the voltage VX is connected in a reverse-biased manner between the first and the second terminals X and Y of the control input end, that is, the negative terminal of the DC drive voltage VX is connected to the first terminal X, and the positive terminal of the DC drive voltage VX is connected to the second terminal Y.

A. When DC drive voltage VX<DC power supply VDC, the cathode voltage of the second diode D2 is VDC, and the anode of the second diode D2 is VX, since DC power supply VDC>DC drive voltage VX, so the second diode D2 is not conducting. As a result, components such as the control circuit module 1, the optocoupler 2 and the light source power supply circuit 4 are protected from reverse bias.

B. When DC drive voltage VX>DC power supply VDC, the cathode voltage of the second diode D2 is VDC, and the anode of the second diode D2 is VX, since DC power supply VDC<DC drive voltage VX, the second diode D2 is conducting and current flows from the second terminal Y through the second diode D2, the first resistor R1, the first diode D1 to the first terminal X, and a loop is formed to protect the components such as the control circuit module 1 and the optocoupler 2 from overvoltage and reverse bias.

In practice, if the circuit structure in accordance with the first embodiment of the present invention is connected to a traditional dimmer circuit having a PWM drive characteristic, this can be regarded as adding a PWM signal between the first and the second terminals X and Y of the control input end, and when the PWM signal is HI, then the voltage is VX'. The following scenarios may happen:

a. When HI voltage VX' of PWM signal<DC power supply VDC, and the voltage VX' is connected in a forward-biased manner between the first and the second terminals X and Y of the control input end (that is, the positive terminal of the voltage VX' is connected to the first terminal X, and the negative terminal of the voltage VX' is connected to the second terminal Y), then the voltage at the node A (VA") is equal to VX'+(0.1~0.2)V, the voltage VA" at the node A charges the capacitor C1 through the second resistor R2. When the PWM signal is switched to LO voltage, the capacitor C1 discharges. As a result, the input end 11 of the control circuit module 1 obtains an equivalent sensing signal (averaged DC voltage value), and the output end 12 of the control circuit module 1 outputs a corresponding control signal that can be fed into the optocoupler 2 via the input end 21. The optocoupler 2 outputs an operating signal from the output ends 23 and 24, which is then fed into the light source power supply circuit 4 through the input ends 41 and 42. The light source power supply circuit 4 then drives the light source 5 to emit light through the output ends 43 and 44.

Therefore, different PWM signals generate different sensing signals that are input to the control circuit module 1, allowing the light source 5 to emit lights of different brightness through the optocoupler 2 and the light source power supply circuit 4. As a result, the external traditional dimmer mechanism (the PWM signal) can be used to control the brightness of the light source 5 (a LED load) using the circuit structure of the present invention.

b. Assuming HI voltage VX' of PWM signal<DC power supply VDC, and the voltage VX' is connected in a reverse-biased manner between the first and the second terminals X and Y of the control input end; or HI voltage VX' of PWM signal>DC power supply VDC, then when the PWM signal is HI, the operations are similar to those described in relation to FIGS. 3 and 4, respectively, and will not be further described; when the PWM signal is switched to LO voltage, then none of the components is actuated. It is obvious that when the circuit structure of the present invention is applied in a traditional PWM-drive dimmer circuit, protection against overvoltage and reversed polarities are also achieved.

In one implementation, depending on the needs, the above circuit of the present invention may include an overload protection element F between the second terminal Y of the control input end and the negative terminal of the DC power supply VDC. The overload protection element F may be a fuse or a thermistor with a positive temperature coefficient (PTC). As such, the overload protection element F cuts or blocks the connection between the circuit of the present invention and the traditional dimmer circuit when abnormal temperature is present in order to prevent damage of the components caused by overheating.

Figure 5:
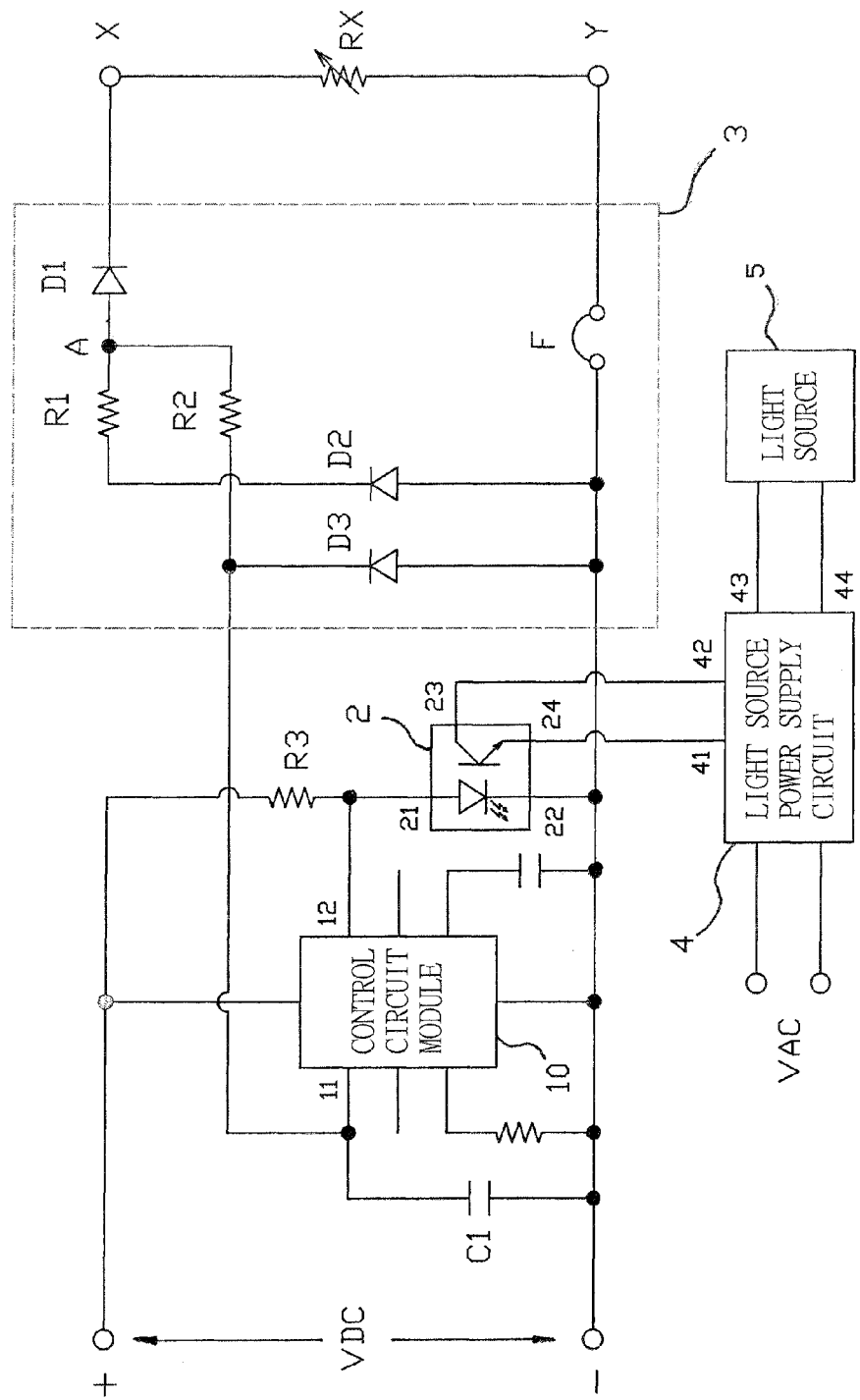
FIG. 5 is a basic circuit structure diagram of a second embodiment of the present invention.

Referring to FIG. 5, a circuit structure in accordance with a second embodiment of the present invention based on the first embodiment essentially includes: a control circuit module 10, and an optocoupler 2 and a protection circuit 3 similar to those described in the first embodiment; the difference being that: the DC power supply VDC is not directly connected with the first resistor R1, and the control circuit module 10 is a circuit structure with built-in current source.

When the circuit structure in accordance with the second embodiment of the present invention is connected with a traditional dimmer mechanism having a variable resistive characteristic, this can be regarded as adding a (variable) resistor RX load between the first and the second terminals X and Y of the control input end. Meanwhile, the control circuit module 1 outputs a current I through the input end 11. The current I passes through the second resistor R2, the first diode D1 and the (variable) resistor RX. A voltage drop VX is created between the two ends of the (variable) resistor RX (VX=I*RX; when the resistance RX changes, the voltage VX changes accordingly), and a voltage VA' is created at the node A (VA'=VX+0.1~0.2V).

The voltage VA' charges the capacitor C1 via the second resistor R2, thus creating a sensing signal that is input into the control circuit module 1 through the input end 11. The control circuit module 1 outputs a corresponding control signal from the output end 12. The control signal is then input to the optocoupler 2 via the input end 21. The optocoupler 2 outputs an operating signal from the output ends 23 and 24, which is then fed into the light source power supply circuit 4 through the input ends 41 and 42. The light source power supply circuit 4 then drives the light source 5 to emit light through the output ends 43 and 44. Therefore, another application aspect is formed.

Figure 6:
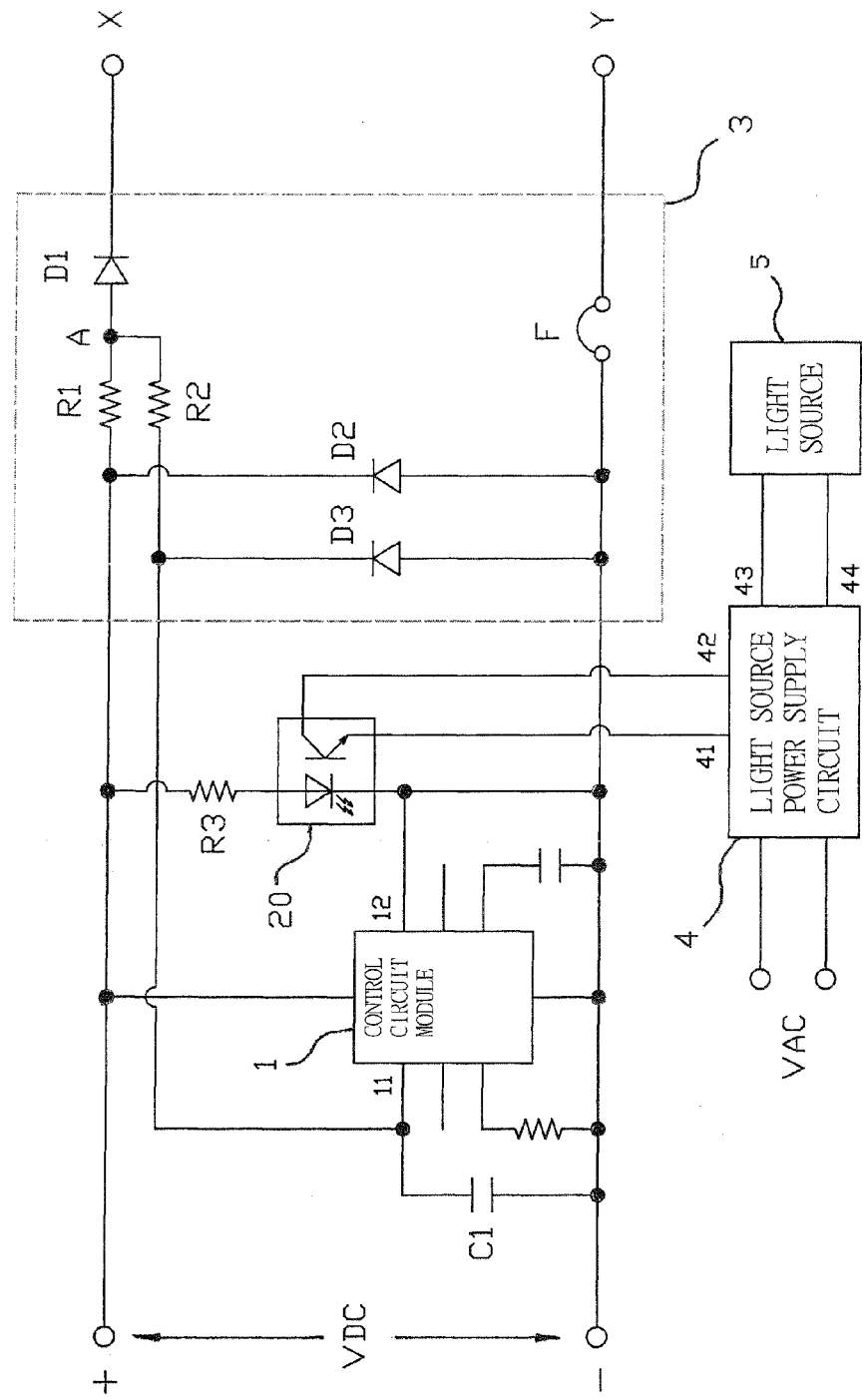
FIG. 6 is a basic circuit structure diagram of a third embodiment of the present invention.

Referring to FIG. 6, a circuit structure in accordance with a third embodiment of the present invention based on the first embodiment essentially includes: an optocoupler 20, and a control circuit module 1 and a protection circuit 3 similar to those described in the first embodiment; the difference being that: the two input ends of the optocoupler 20 are provided between the third resistor R3 and the output end 12 of the control circuit module 1. In this way, the optocoupler 20 can obtain a control signal in reverse polarity to that on the output end 12 of the control circuit module 1, so that the optocoupler 20 may also output a reversed operating signal, thus creating another type of operation.

In view of the above, the isolation dimmer circuit structure of the present invention allows traditional dimmer circuits to be used to control the illumination of LEDs, it also reduces development and production costs while providing several types of protection, and is thus submitted to be novel and non-obvious and a patent application is hereby filed in accordance with the patent law. It should be noted that the descriptions given above are merely descriptions of preferred embodiments of the present invention, various changes, modifications, variations or equivalents can be made to the invention without departing from the scope or spirit of the invention. It is intended that all such changes, modifications and variations fall within the scope of the following appended claims and their equivalents.

What is claimed is:
1. An isolation dimmer circuit structure comprising:
  a control circuit module provided between a positive terminal and a negative terminal of a DC power supply, the control circuit module including an input end for receiving a sensing signal and an output end for outputting a control signal;

an optocoupler including an input end connected to the output end of the control circuit module, the optocoupler further including two output ends connected to input ends of a light source power supply circuit, output ends of the light source power supply circuit being connected to a light source, wherein the optocoupler receives and converts the control signal from the control circuit module into an operating signal to be outputted, the operating signal is then received by the light source power supply circuit to generate different outputs that allow changes in the brightness of the light source; and a protection circuit including a first resistor, a second resistor, a first diode, a second diode and a third diode, wherein one end of the first resistor is connected to the positive terminal of the DC power supply, while the other end of the first resistor is connected to the anode of the first diode at a node A, the cathode of the first diode is connected to a first terminal of a control input end, the second resistor is provided between the node A and the input end of the control circuit module, the cathode of second diode is connected to the positive terminal of the DC power supply, while the anode of the second diode is connected to a second terminal of the control input end, the cathode of third diode is connected to the input end of the control circuit module, while the anode of the third diode is connected to the second terminal of the control input end.

2. The isolation dimmer circuit structure as claimed in claim 1, wherein the input end of the control circuit module is further connected to the negative terminal of the DC power supply via a capacitor, such that the capacitor forms a RC circuit with the second resistor.

3. The isolation dimmer circuit structure as claimed in claim 1, wherein a protection circuit further includes an overload protection element provided between the second terminal of the control input end and the negative terminal of the DC power supply.

4. The isolation dimmer circuit structure as claimed in claim 1, wherein the overload protection element is a fuse.

5. The isolation dimmer circuit structure as claimed in claim 1, wherein the overload protection element is a thermistor with a positive temperature coefficient.

6. The isolation dimmer circuit structure as claimed in claim 1, wherein the light source is a light emitting diode.

7. The isolation dimmer circuit structure as claimed in claim 1, wherein the control circuit module is a circuit structure with a built-in current source.

\* \* \* \* \*